United States Patent
Xu et al.

(10) Patent No.: US 9,336,460 B2
(45) Date of Patent: May 10, 2016

(54) ADAPTIVE MOTION INSTABILITY DETECTION IN VIDEO

(71) Applicant: Intel Corporation, Santa Clara, CA (US)

(72) Inventors: Lidong Xu, Beijing (CN); Chen Wang, Beijing (CN); Yi-Jen Chiu, San Jose, CA (US); Jong Dae Oh, San Jose, CA (US); Heon-Mo Koo, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 119 days.

(21) Appl. No.: 14/218,457

(22) Filed: Mar. 18, 2014

(65) Prior Publication Data
US 2014/0355895 A1    Dec. 4, 2014

Related U.S. Application Data

(60) Provisional application No. 61/829,417, filed on May 31, 2013.

(51) Int. Cl.
G06K 9/00 (2006.01)
G06K 9/62 (2006.01)
H04N 5/232 (2006.01)

(52) U.S. Cl.
CPC .......... G06K 9/6298 (2013.01); H04N 5/23267 (2013.01)

(58) Field of Classification Search
None
See application file for complete search history.

(56) References Cited

U.S. PATENT DOCUMENTS

| | | | | |
|---|---|---|---|---|
| 5,973,733 A | * | 10/1999 | Gove | H04N 5/145 348/142 |
| 6,809,758 B1 | * | 10/2004 | Jones | H04N 5/145 348/208.99 |

(Continued)

FOREIGN PATENT DOCUMENTS

WO    2007017840    2/2007

OTHER PUBLICATIONS

Extended European Search Report for EP Application No. 14170559.0, mailed Nov. 20, 2014.

*Primary Examiner* — Aaron W Carter
(74) *Attorney, Agent, or Firm* — Green, Howard & Mughal LLP

(57) ABSTRACT

One or more apparatus and method for adaptively detecting motion instability in video. In embodiments, video stabilization is predicated on adaptive detection of motion instability. Adaptive motion instability detection may entail determining an initial motion instability state associated with a plurality of video frames. Subsequent transitions of the instability state may be detected by comparing a first level of instability associated with a first plurality of the frames to a second level of instability associated with a second plurality of the frames. Image stabilization of received video frames may be toggled first based on the initial instability state, and thereafter based on detected changes in the instability state. Output video frames, which may be stabilized or non-stabilized, may then be stored to a memory. In certain embodiments, video motion instability is scored based on a probability distribution of video frame motion jitter values.

18 Claims, 9 Drawing Sheets

(56) References Cited

U.S. PATENT DOCUMENTS

| | | | |
|---|---|---|---|
| 7,671,916 B2* | 3/2010 | Hashimoto | H04N 7/181 250/206.1 |
| 7,676,081 B2* | 3/2010 | Blake | G06K 9/00234 358/538 |
| 8,233,693 B1* | 7/2012 | DiFrancesco | G06T 7/001 382/141 |
| 8,891,626 B1* | 11/2014 | Bankoski | H04N 19/137 375/240.16 |
| 2005/0157949 A1* | 7/2005 | Aiso | G06T 3/0056 382/299 |
| 2009/0074247 A1* | 3/2009 | Ma | G06T 7/20 382/103 |
| 2010/0138797 A1* | 6/2010 | Thorn | G06F 3/017 715/863 |
| 2011/0187877 A1* | 8/2011 | Muukki | H04N 5/228 348/208.4 |
| 2011/0201916 A1* | 8/2011 | Duyn | G01R 33/283 600/410 |
| 2013/0329062 A1* | 12/2013 | Zhou | H04N 5/23248 348/208.1 |
| 2014/0002681 A1* | 1/2014 | Campbell | H04N 5/23267 348/208.99 |
| 2014/0267801 A1* | 9/2014 | Grundmann | H04N 5/2329 348/208.1 |
| 2014/0300767 A1* | 10/2014 | Lischinski | G06T 5/002 348/208.6 |
| 2014/0355895 A1* | 12/2014 | Xu | H04N 5/23267 382/228 |

\* cited by examiner

ADAPTIVE MOTION INSTABILITY DETECTION IN VIDEO

CROSS-REFERENCE TO RELATED APPLICATIONS

This application claims the benefit of U.S. Provisional Application 61/829,417, filed on May 31, 2013 and titled "ADAPTIVE SHAKINESS DETECTION FOR VIDEO STABILIZATION."

BACKGROUND

A graphics engine, graphics processing unit (GPU), or visual processing unit (VPU), is a specialized electronic circuit designed to rapidly manipulate and alter memory to accelerate the creation of images in a frame buffer typically intended for output to a display. GPUs may be found in embedded systems, mobile phones, tablets, notebook computers, high performance computation (HPC) servers, and game consoles. In addition to manipulating computer graphics, a highly parallel architecture also enables a GPU to more generally perform processing of large blocks of video stream and image data in parallel.

Video cameras are now ubiquitous in mobile electronic media devices. Video cameras are available in wearable form factors (e.g., video capture earpieces, video capture headsets, video capture eyeglasses, etc.), as well as embedded within smartphones, tablet computers, and notebook computers, etc. In many circumstances, these devices capture image sequences (i.e., video) under non-ideal conditions and the acquisition equipment is highly constrained by the mobile form factor. For example, in situations such as filming from a moving vehicle or using an unsteady hand, many videos show a high degree of undesirable motion instability or motion jitter (i.e., shakiness). Even videos acquired in less severe conditions often show undesirable shaking.

Video stabilization aims at removing undesired shaky motion from videos. Although some capture devices provide mechanical image stabilization, image processing techniques are often employed in the alternative, or in addition to, mechanical stabilization. Such image processing techniques typically involve calculating image motion and performing some form of frame warping to counter the calculated image motion. Stabilization via image processing can however severely degrade the visual quality of an input video, particularly where the input video does not suffer significant motion instability, or where the stabilization algorithm relies on assumptions ill-suited to the input video.

Image processing-based motion stabilization might be advantageously enabled only as needed based on a motion sensor, such as gyroscope and/or accelerometer. However, such a front-end solution can be readily applied only by the capture device, which often may not have the needed processing resources and/or secondary sensor capability.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Figure 1A:
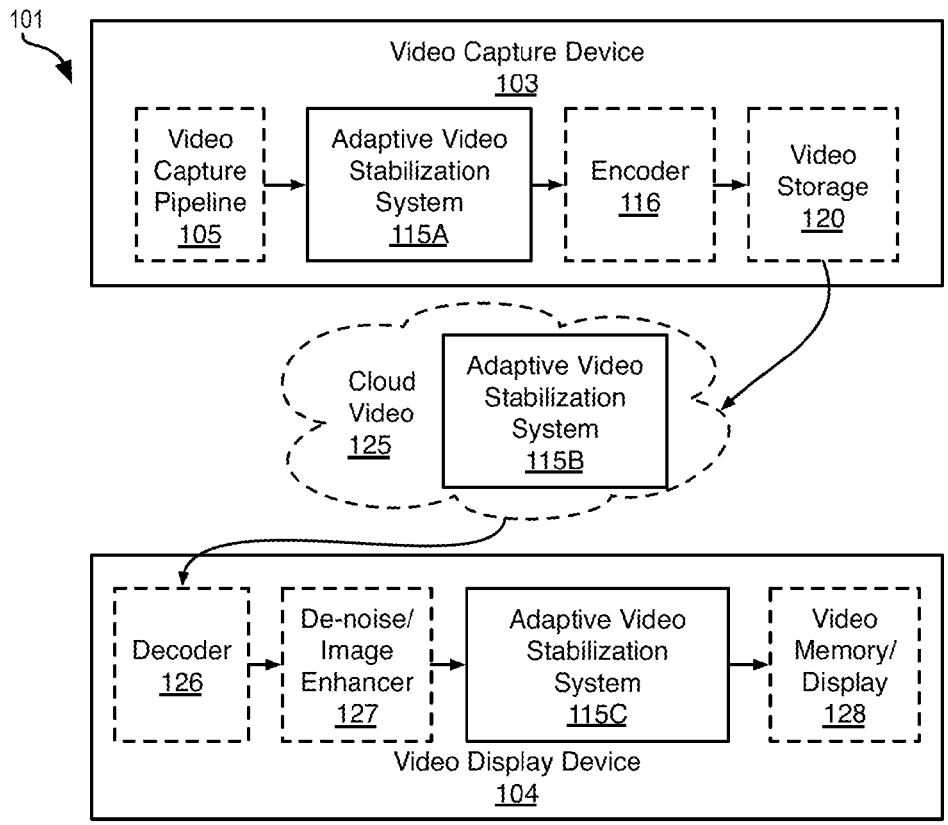
FIG. 1A is a functional block diagram of a video transmission architecture, in accordance with an embodiment.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures such system-on-a-chip (SoC) architectures or GPU architectures for example, implementation of the techniques and/or arrangements described herein are not restricted to particular architectures and/or computing systems and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and inter-relationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein are implemented in hardware, for example as logic circuitry in a graphics processor. Certain other portions may be implemented in hardware, firmware, software, or any combination thereof. At least some of the material disclosed herein may also be implemented as instructions stored on a machine-readable medium, which may be read and executed by one or more processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

One or more system, apparatus, method, and computer readable media are described below for adaptive motion instability detection in video. In the exemplary embodiments described in detail below, image processing-based video stabilization is predicated on the adaptive motion instability detection. However, the adaptive motion instability detection techniques and systems described herein may also be utilized in other application spaces. Adaptive motion instability detection may entail determining an initial motion instability state associated with a plurality of video frames. Subsequent transitions of the instability state may then be detected by comparing a first level of instability associated with a first plurality of the frames to a second level of instability associated with a second plurality of the frames. Motion stabilization processing of received video frames may be toggled first based on the initial instability state, and thereafter based on detected changes in the instability state. Output video frames, which may be stabilized or non-stabilized, may then be stored to a memory. In certain embodiments, video motion instability is scored based on a probability distribution of video frame motion jitter values.

FIG. 1A is a functional block diagram of video transmission architecture 101, in accordance with an embodiment. Architecture 101 includes a video capture device 103 and a video display device 104 either coupled directly together, or coupled together through video cloud service 125. Capture device 103 includes an adaptive video stabilization system 115A. Adaptive video stabilization system 115A receives as an input a video stream output by video capture pipeline 105. Stabilized video output by video stabilization system 115A is passed to encoder 116. Encoded video is then stored in video storage 120 for subsequent playback, and/or for transmission to cloud video service 125. Cloud video service 125 may then process the encoded video, for example passing the video through video stabilization system 115B. Display device 104 receives encoded video, which is passed through decoder 126. Image quality of a decoded video stream is improved by processing in de-noise/image enhancer 127. Adaptive video stabilization system 115C receives an input video stream output by de-noise/image enhancer 127. Stabilized video is then output to video memory and/or display 128.

In embodiments, one or more of adaptive video stabilization systems 115A, 115B, or 115C include processor logic to detect the presence of video motion instability based solely on image processing. In further embodiments, one or more of video stabilization systems 115A, 115B, or 115C include video processor logic to apply image stabilization processes selectively to video in response to detecting such motion instability. Motion instability detection and stabilization may be performed as part of a post-production process, for example by either adaptive video stabilization system 115A or 115B. Advantageously however, instability detection and stabilization as described herein may be performed substantially in real time, for example by adaptive video stabilization system 115C, as video display device 104 performs video play back. For embodiments where more than one of adaptive video stabilization systems 115A, 115B, and 115C perform image-based instability detection and stabilization, various associated detection and stabilization parameters may be specified for each, allowing for multiple levels of stabilization particular to guidelines chosen by managers of the respective systems.

Figure 1B:
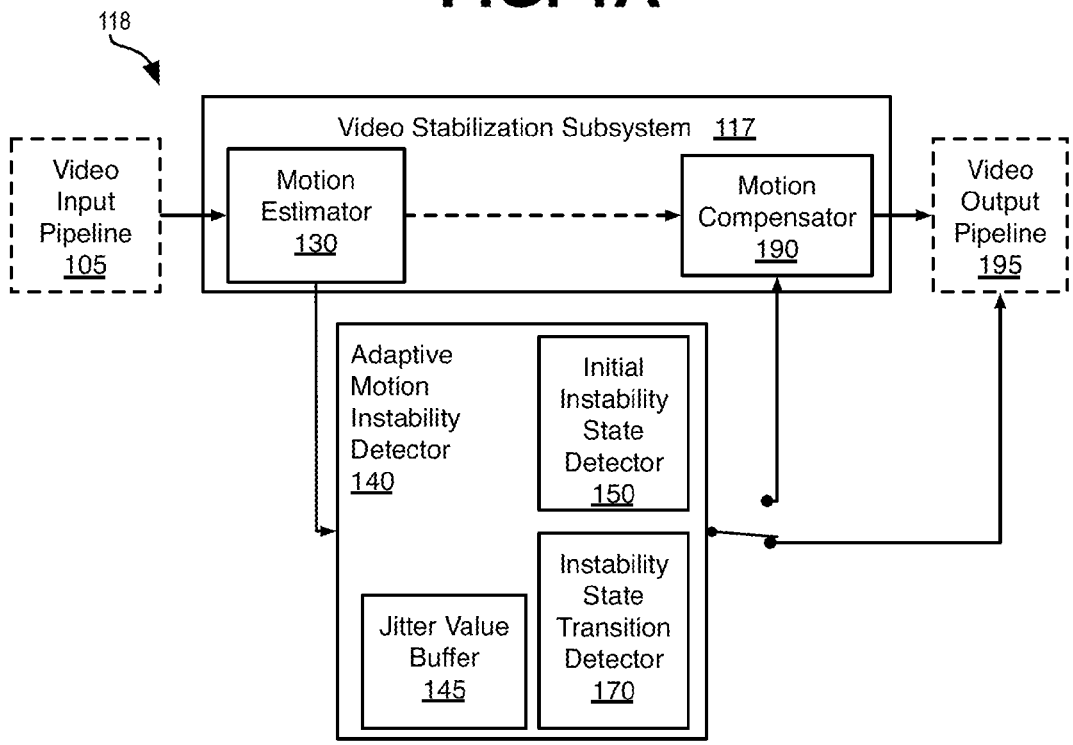
FIG. 1B is a functional block diagram of a video stabilization system, which may be employed within the video transmission architecture depicted in FIG. 1A, in accordance with an embodiment.

FIG. 1B is a functional block diagram of a video stabilization system 118, in accordance with an embodiment. Adaptive video stabilization system 118 may be employed as a component of any of video stabilization systems 115A, 115B, or 115C. Adaptive video stabilization system 118 receives video from video input pipeline 105, the components of which may vary with the context in which adaptive video stabilization system 118 is implemented. Video is input into image-based video stabilization subsystem 117, which in the exemplary embodiment further includes motion estimator 130 and motion compensator 190. Motion estimator 130 includes logic (circuitry) to determine an estimate of global motion in the input video stream, for example across sequential frames based on regions perceived as background, etc. Motion compensator 190 includes logic to reduce or eliminate motion instability from the video stream, for example by applying one or more frame warping algorithms. Generally, any motion estimation and any motion compensation may be performed by video stabilization subsystem 117. For embodiments herein however, compensation of estimated motion is conditioned on, or predicated upon, a detection of motion instability. As further shown in FIG. 1B for example, output from motion estimator 130 is analyzed by adaptive motion instability detector 140, with motion compensation performed by motion compensator 190 predicated on a detection of motion instability within the input video. As such, motion compensation is made selective to motion-instable video frames. For any given video input, video stabilization subsystem 117 may pass either, or both, motion stabilized and non-stabilized video portions to video output pipeline 195. Video output pipeline 195 may include memory (e.g., one or more frame buffers) and one or more displays (e.g., LCD, etc.).

In exemplary embodiments, video motion instability detection is adaptive including both an initial instability state detector 150 and an instability state transition detector 170. Initial instability state detector 150 includes logic to determine a level of motion instability in an input video and then to initiate motion compensation, or not, based on an initial instability threshold. Motion compensator 190 is to apply video/image stabilization algorithm(s) to video frames (or not) until such compensation is toggled by instability state transition detector 170 in response detecting a change in video motion instability. In embodiments, as described further below, instability state transition detector 170 includes logic to compare a first level of instability associated with a first plurality of video frames with a second level of instability associated with a second plurality of frames. An independent threshold may be applied to this comparison. In exemplary embodiments, both initial instability state detector 150 and instability state transition detector 170 are coupled to jitter value buffer 145 and include logic to utilize jitter values from buffer 145 in their respective functions, as is described further below. With this adaptive video stabilization architecture, motion compensation may be advantageously turned "on" promptly (e.g., within a few tens of frames) and also turned "on" and "off" as needed throughout the duration of a video, which may comprise many thousands of frames. The ability to adapt to changes in video motion instability substantially in real time may advantageously reduce the possibility that motion compensator 190 performs unnecessarily and/or to the detriment of image quality.

Figure 2:
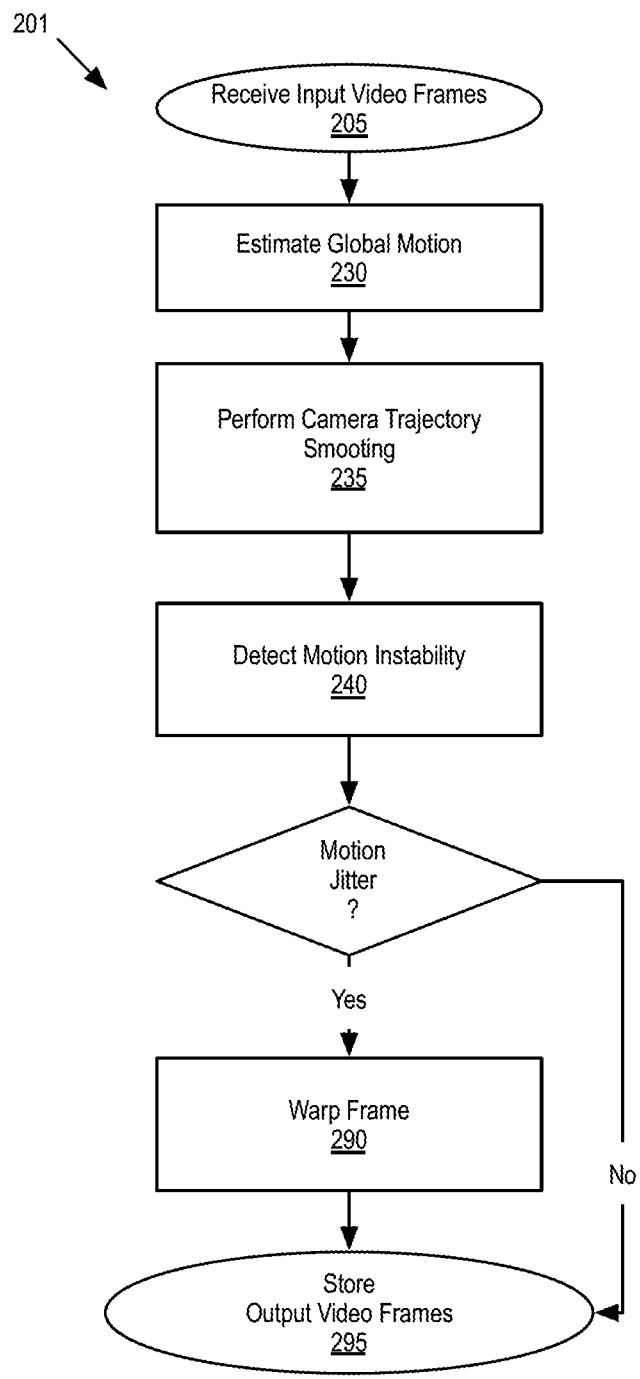
FIG. 2 is a flow diagram illustrating a method of adaptive motion instability detection for video stabilization, in accordance with an embodiment.

FIG. 2 is a flow diagram illustrating a method 201 of adaptive motion instability detection for video stabilization, in accordance with an embodiment. In an embodiment, method 201 is performed by adaptive video stabilization system 118. Method 201 begins with receiving input video frames at operation 205. Global motion is estimated at operation 230. Global motion estimation entails finding the dominant motion vector between adjacent video frames (e.g., between a pair of consecutive frames). Many algorithms are known for analyzing video to arrive at an estimate of dominant motion between frames, and embodiments describe described herein are not limited in this respect. At operation 235, camera trajectory smoothing is performed. For smoothing operation 235, a smoother camera motion vector trajectory is determined based on the global motion estimates computed at operation 230. This trajectory may be considered the result of applying a low pass filter to the estimated camera's motion.

At operation 240 motion instability within the video is monitored and/or detected via analysis of video frames. In one exemplary embodiment, operation 240 entails a computation of motion jitter values for one or more frames. As an example, motion jitter values may be determined for a given frame by subtracting out the smoothed camera trajectory computed at operation 235 from the actual position associated with the video frame. As shown in FIG. 2, method 201 either proceeds to frame warping operation 290 or bypasses application of such image stabilization as conditioned on the motion jitter value(s). While any frame warping technique may be applied at frame warping operation 290, it is noted than many techniques rely, at least in part, on motion jitter values to determine the proper image filter. Whereas, stabilization typically utilizes motion jitter values on a frame-by-frame basis, in embodiments herein motion instability detection is facilitated by buffering motion jitter values (e.g., in jitter value buffer 145) over a larger number of frames (e.g., many tens of frames). In embodiments therefore, motion jitter values are employed for assessing the need for video stabilization and/or conditioning application of video stabilization, as well as for actually stabilizing the frame. Consequently, adaptive motion instability detection may require minimum addition computational complexity beyond that of basic non-adaptive and/or non-conditional video stabilization. Method 201 completes with storing output video frames (e.g., stabilized, and/or unstabilized) to a (video) memory at operation 295.

Figure 3:
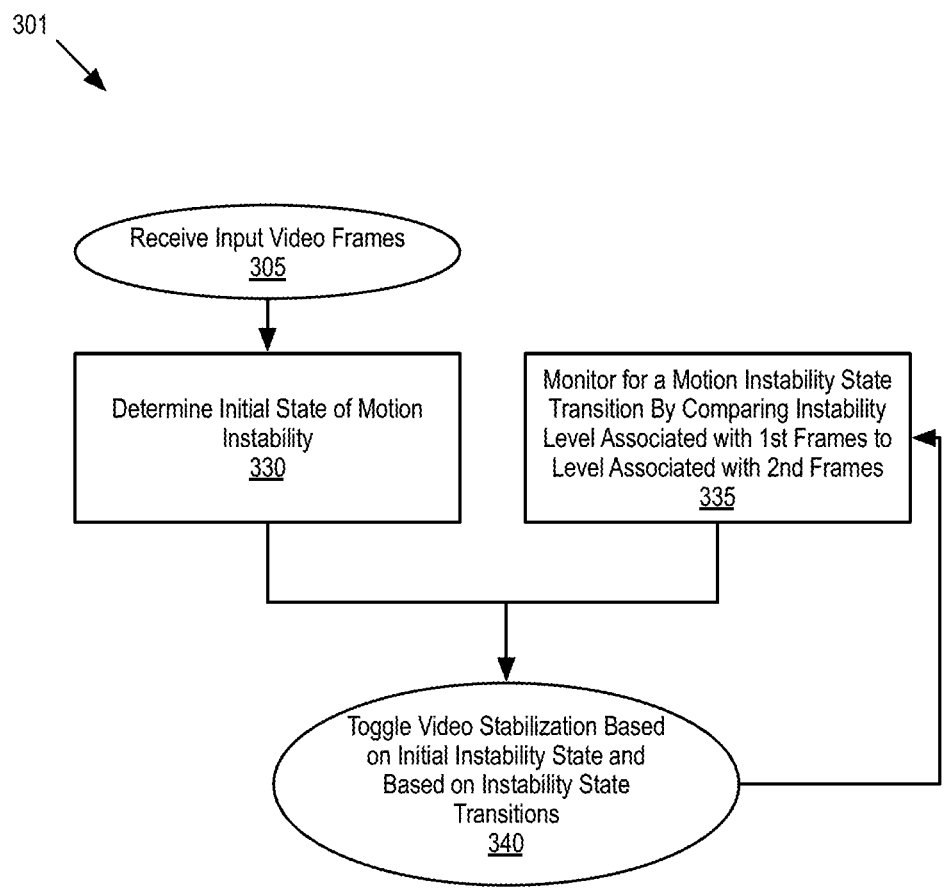
FIG. 3 is a flow diagram illustrating a method of adaptively toggling video stabilization based on motion instability states, in accordance with an embodiment.

FIG. 3 is a flow diagram illustrating a video processing method 301 with adaptive toggling of video stabilization based on motion instability states, in accordance with an embodiment. In an embodiment, method 301 is performed by adaptive video stabilization system 118. Method 301 is one exemplary embodiment of motion instability detection operation 240 and in a further embodiment is performed by adaptive motion instability detector 140. Method 301 begins with receiving video frames at operation 305. From one or more of the recited video frames, an initial state of motion instability is determined at operation 330. In embodiments, a determination of the initial motion instability state is based on a single analysis window spanning a predetermined number of received frames. Within this window, a motion instability/stability score is computed and that score may be thresholded to determine the initial instability state. At operation 334, received video frames are then monitored for a transition in the motion instability state by comparing a first level of instability associated with a first subset of the received frames with a second level of instability associated with a second subset of the received frames. In other words, at least two motion instability assessments are made based on two windows spanning some number of frames within different portions of the received video. At operation 340, video stabilization is toggled based on both the initial instability state and on instability state transitions. The initial motion instability state may be fixed or "locked" based on the instability/stability score determined at operation 330. Image processing-based video stabilization is either applied, or not, to received video frames until any instability state transition is detected at operation 335, at which point image processing-based video stabilization is either discontinued or introduced. Transitions are then continually monitored via operation 335 over all the received video frames with application of video stabilization at operation 340 tracking detected video motion instability transitions. For example, if an instability score determined at operation 330 satisfies a threshold and the initial instability state is therefore deemed unstable, or "shaky," video stabilization is toggled at operation 340 to apply image stabilization processing to the received frames until toggled off at operation 340 in response to detecting any instability state transition at operation 335. If instead the instability score determined at operation 330 fails to satisfy a threshold and the video frames deemed stable, video stabilization is toggled such that received frames bypass image stabilization processing until toggled again in response to any instability state transition detected at operation 335.

Figure 4:
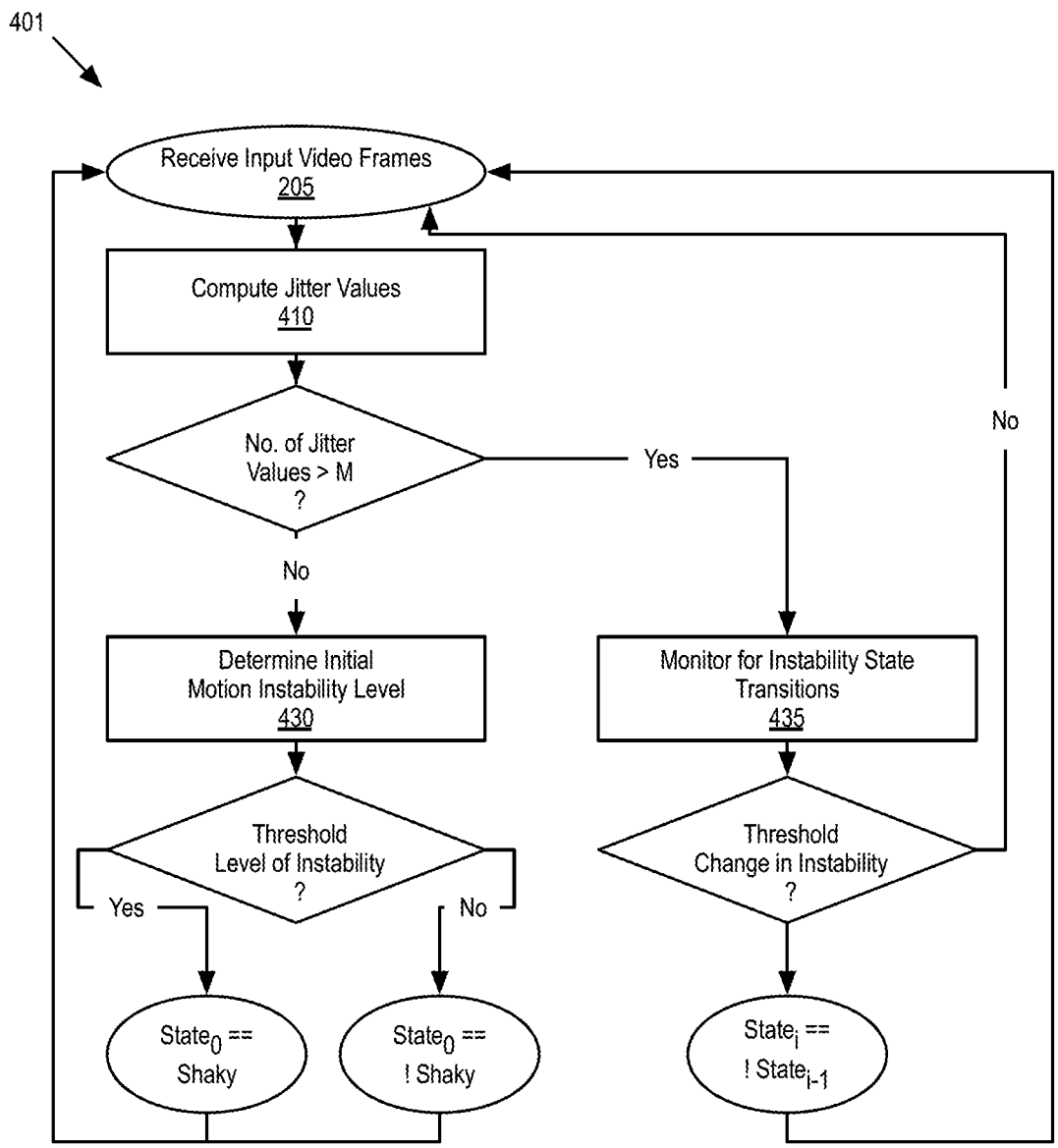
FIG. 4 is a flow diagram illustrating a method of determining an initial video motion instability state and monitoring for transitions in the instability state, in accordance with an embodiment.

FIG. 4 is a flow diagram illustrating a method 401 of determining an initial video motion instability state and monitoring for transitions in the instability state, in accordance with an embodiment. The method 401 illustrates one exemplary embodiment of operations 330 and 335 illustrated in FIG. 3. Method 401 begins with receiving input video frames at operation 205. At operation 410 jitter values are computed, for example, based on residual motion vectors determined from global motion estimates and low-pass filtered camera trajectories. Such jitter values are buffered as they are computed with each incoming frame. With each additional input frame, the number of jitter values buffered is compared against a predetermined jitter value count threshold (m) to conditionally branch between a first algorithm for determining an initial video motion instability state and a second algorithm for monitoring video motion instability state transitions. The predetermined jitter value count threshold m may be a programmable parameter, for example selectable by an application layer and configurable through a video processor driver. A smaller jitter value count threshold m may allow more rapid application of video motion stabilization (i.e., stabilization at a lower frame number) while a larger number may improve confidence in the initial state determination. Exemplary jitter value count thresholds are between 40 and 200 frames.

If the jitter value count threshold m is not yet satisfied (e.g., count is less than m), method 401 proceeds to operation 430, where the initial level of motion instability is determined. This initial level is then thresholded to determine the initial instability state. Where the initial level satisfies the threshold, the initial video instability state ($State_0$) is deemed "shaky." Where the initial level fails to satisfy the threshold, $State_0$ is deemed "not shaky." The predetermined initial state threshold may again be a programmable parameter, for example selectable by an application layer and configurable through a video processor driver. In embodiments, operation 430 entails determining an instability score for at least some of the first plurality of video frames that are collected up to reaching the jitter value count threshold m. Each instability score is indicative of motion jitter values associated with a predetermined number of prior video frames (n). The motion instability score may be determined at operation 430 over some number of subsets with the m jitter values. Depending on the number of jitter values in the subset relative to the jitter value count threshold m, any number of instability scores may be generated at operation 430. Where m and n are equal for example, one instability score determined at operation 430 may be thresholded to determine the initial instability state. In the event that m is larger than n, a plurality of instability scores determined at operation 430 may be reduced to a statistic indicative all the scores accumulated over the motion jitter value count threshold m. This statistic may then be compared against the instability level threshold to determine the initial instability state.

An instability score may be determined through application of various algorithms at operation 430. In an exemplary embodiment, a set of instability motion jitter values is tested for normality to determine levels of video motion. A premise of such a test is that "shaky" motion jitter within the x-dimension or y-dimension motion vector components is randomly distributed. As such, the distribution of jitter values associated with a number of prior video frames may be scored based on the extent to which they follow a Gaussian distribution. A set of jitter values more normally distributed, for example, may be assigned a higher instability score while a set of jitter values less normally distributed may be assigned a lower instability score. Video stabilization may then be applied selectively to frames associated with a sufficiently high instability score (i.e., in a "shaky" state).

Figure 5:
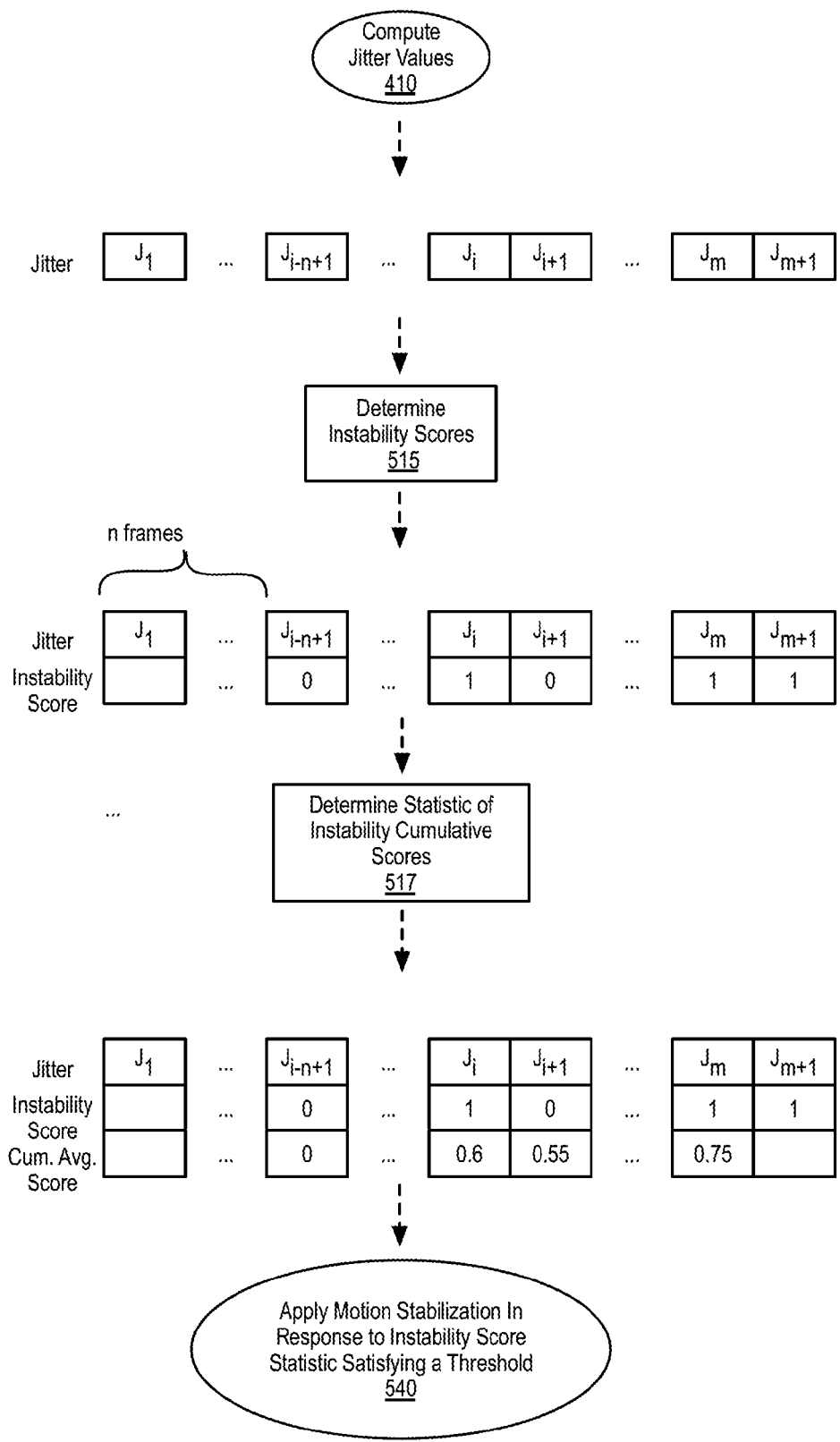
FIG. 5 is a data flow diagram illustrating processing of video to determine an initial video motion instability state, in accordance with an embodiment.

FIG. 5 is a data flow diagram illustrating processing of video to determine an initial video motion instability state, in accordance with an embodiment. The techniques illustrated in FIG. 5 may be employed in a specific embodiment of operations 330 and 340 in FIG. 3. As shown in FIG. 5, jitter vector $J_1$ through $J_m$ are associated with a last m frames received as input video frames at operation 410. Hence, upon receiving video frame i, a jitter vector J is computed for each of n consecutive video frames associated with jitter vector $J_{i-n+1}$ through $J_i$. Notably, for each jitter vector J denoted in FIG. 5, two jitter values corresponding to x and y components of a motion vector may be computed (e.g., $J_{x,1}$ and $J_{y,1}$ through $J_{x,m+1}$ and $J_{y,m+1}$). At operation 515, instability scores are determined. In the exemplary embodiment, an instability score is determined for each video frame using a statistical method to compare the jitter values' probability distribution of the previous n consecutive frames. In one such embodiment, each instability score is based on a hypothesis test comparing a Gaussian distribution with a distribution of the motion jitter values associated with the n preceding frames. An exemplary hypothesis test (HT) is Lilliefor's HT, which is suitable where a mean and variance are not known. For such an embodiment, each instability score may be 0 or 1, for a HT failure and HT pass, respectively. Hence, a first instability score is associated with a frame having corresponding jitter value $J_n$. Every frame/jitter value thereafter is associated with an instability score derived from the proceeding n frames/jitter values until at least frame m is received. In the exemplary embodiment where the same instability-scoring algorithm is applied as a basis for detecting a transition in the motion jitter, every received frame in a given video is scored over a moving widow encompassing the previous n consecutive frames. Each instability score may be representative of both jitter value components (e.g., $J_{x,i-n+1}$, $J_{y,i-n+1}$), for example taking a score of the most motion unstable component. Alternatively, separate x and y component instability scores may be determined.

As previously described, instability scores may be accumulated up to the jitter value count threshold m, at which point the accumulation statistic may be thresholded to determine an initial instability state from which subsequent transitions will be detected. In the exemplary embodiment illustrated in FIG. 5, a cumulative average instability score is generated for each jitter value between at least $J_n$ and $J_m$. The cumulative average instability score may again be separated by x and y components, or reduced into a worst-case instability score, etc. At operation 540, image processing-based motion stabilization is applied in response to the instability score statistic satisfying a predetermine threshold, which may be user programmable through an application layer. The initial instability state, and resulting application of image stabilization, may be locked at the state determined based on a cumulative average instability score at frame m. In one such embodiment, until frame m is received, motion stabilization is applied on a per-frame basis as a function of the instability score(s) corresponding to the received frame. For example, a video frame i is deemed "shaky" if the cumulative average Gaussian distribution comparison results from a first frame (e.g., associated with jitter value $J_n$) to the current frame (e.g., associated with jitter value $J_i$) satisfies a predetermined level of instability (e.g. >0.75). Otherwise the current frame is considered a stable frame. Frame stabilization may therefore be toggled "on" as early as the frame associated with jitter value $J_n$. In an alternate embodiment, no motion stabilization is applied to any frame until frame m is received and the initial instability state is defined based on the cumulative average instability score (e.g., 0.75 at frame m). In either embodiment, accumulation of instability scores within the first m frames allows for increased confidence in the determined instability state as jitter count threshold m becomes larger.

Figure 6:
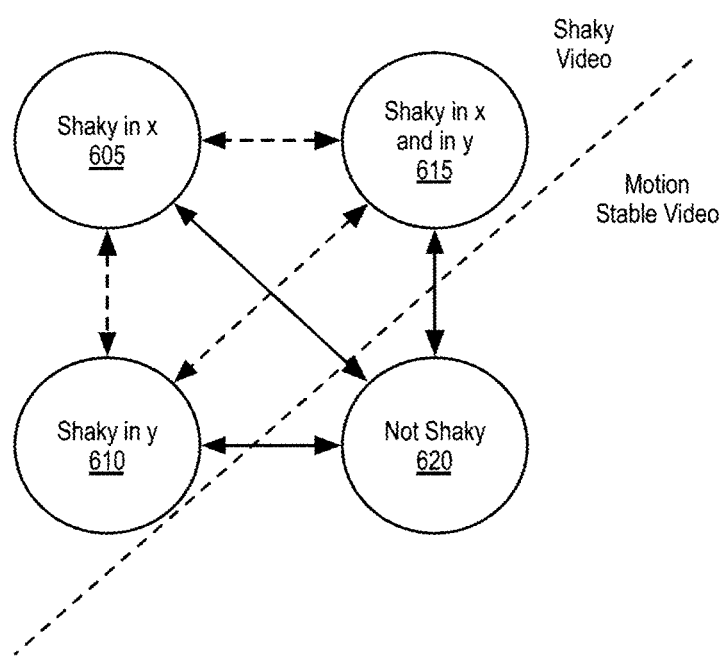
FIG. 6 is a state diagram illustrating state transitions monitored by an adaptive motion instability detection system, in accordance with an embodiment.

Returning to FIG. 4, if the jitter value count threshold m is satisfied, method 401 proceeds to operation 433, where instability state transitions are monitored. In the exemplary embodiment a change in stability level is thresholded. A predetermined state transition threshold may again be a programmable parameter, for example selectable by an application layer and configurable through a video processor driver. Where the stability level change satisfies the threshold, the video instability state (State$_i$) is toggled to the converse of the prior instability state (State$_{i-1}$). Where the stability level change fails to satisfy the threshold, the current instability state is maintained. Noting that instability detection may entail the analysis of two components (x,y) of inter-frame motion vectors, instability state transitions may likewise take a number of forms where the before (first) or after (second) instability states may have instability in either or both the x and y components. FIG. 6 is a state diagram illustrating state transitions monitored by an adaptive motion instability detection system, in accordance with an embodiment. As depicted motion instability is present in each of states 605 (where there is motion shake in only x), 610 (where there is motion shake in only y), and 615 (where there is motion shake both x and y). Transitions from/to any of states 605, 610, and 615 to/from the "not shaky" state 620 is to be detected at operation 433 in FIG. 4.

Figure 7:
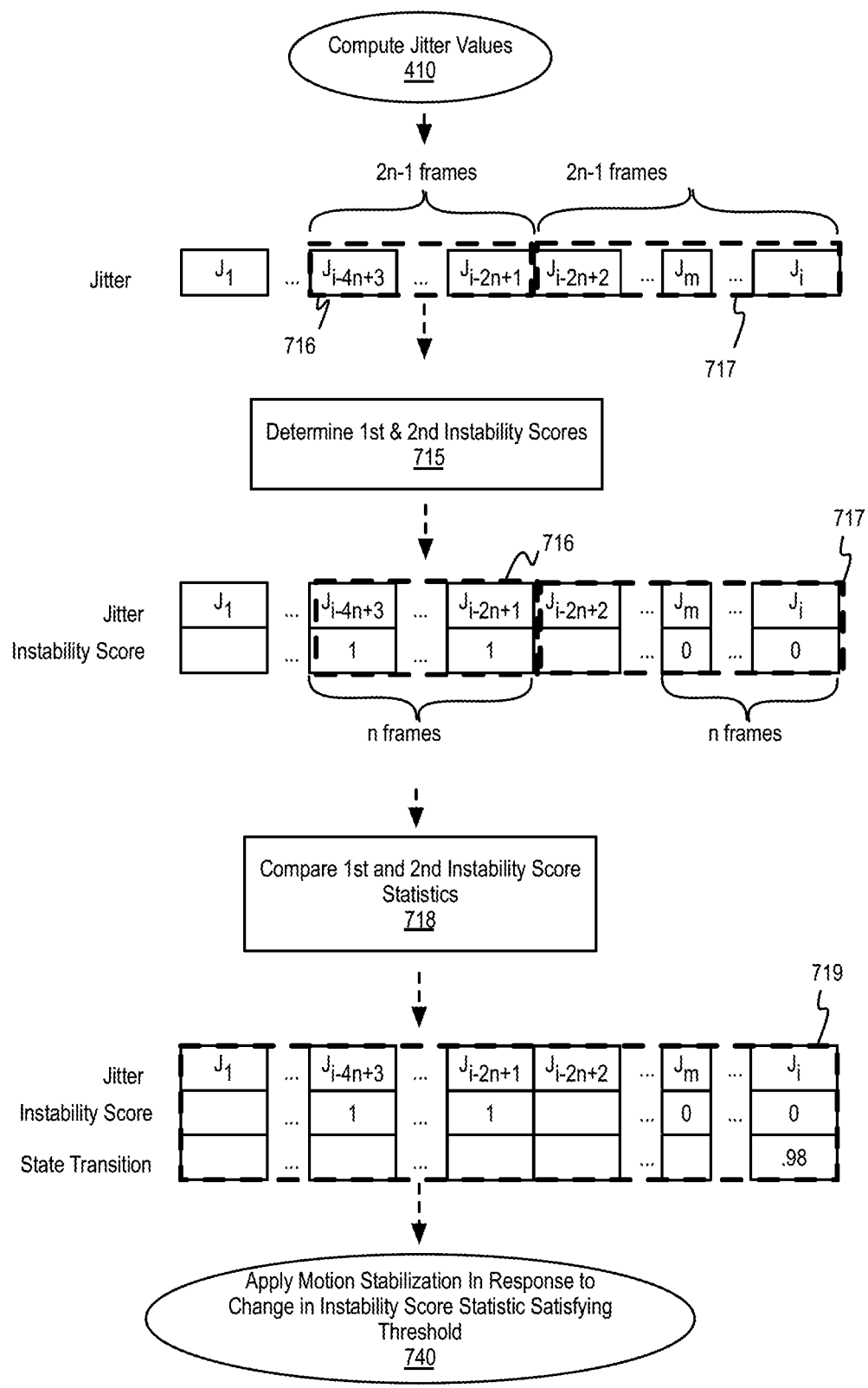
FIG. 7 is a data flow diagram illustrating processing of video to monitor a transition in video motion instability state, in accordance with an embodiment.

FIG. 7 is a data flow diagram illustrating processing of video to monitor transitions in video motion instability state, in accordance with an embodiment. The techniques illustrated in FIG. 7 may be employed as one specific embodiment of operations 335 and 340 in FIG. 3. In FIG. 7, the notation introduced in FIG. 5 is maintained. Beginning at operation 410, jitter values J (e.g., $J_{i,x}$, $J_{i,y}$) are computed for a plurality of frames as previously described. At operation 715, a first instability score is determined for at least some of the plurality of video frames based on their corresponding jitter values. A second instability score is determined for at least some other of the plurality of video frames, again based on their corresponding jitter values. This pair of score groups may be compared to detect a change in jitter value probability distribution across video frames.

For one such an embodiment, at a frame i, 4n−2 jitter values are employed for instability state transition detection. The 4n−2 jitter values are equally divided into two groups illustrated as jitter value sample windows 716 and 717, respectively. In this exemplary embodiment where an instability score is determined from n video frames, n instability scores may be generated for each group of 2n−1 jitter values associated with 2n−1 frames. In a further embodiment, a normality test (e.g., Lilliefor's HT) is performed over n preceding jitter values, to generate n instability scores indicative of jitter values associated with n frames just as for the initial motion instability determination described elsewhere herein. For example, a HT score (e.g., 0 or 1) may be determined for each frame associated with jitter value $J_{1-4n+3}$ through $J_{i-2n+1}$ within the jitter sample window 716. Likewise, HT scores may be determined for each frame associated with jitter value $J_{i-2n+2}$ through $J_i$ within the jitter sample window 717.

The first and second sets of n instability scores are then compared at operation 718. A statistic for each of the first and second sets of instability scores may be employed in the comparison. At operation 740, motion stabilization may be applied in response to a difference between the first statistic (e.g., associated with n first normality tests from jitter sample window 716) and the second statistic (e.g., associated with n second normality tests from jitter sample window 717), satisfying a predetermined threshold. For example, where the statistic is an average of the instability score over n motion jitter values, the comparison performed at operation 718 may be the absolute difference between a summation of the instability score over the n frames within jitter sample window 716 and a summation of the instability score over the n frames within jitter sample window 717, divided by n. Since the probability distributions of the jitter values should change to be more/less Gaussian with changes in motion instability, the absolute difference between the instability scores accumulated over the pair of jitter sample windows 716, 717 will deviate when the windows straddle the instability transition point (e.g., between jitter values $J_{i-2n+1}$ and $J_{i-2n+2}$ in FIG. 7).

If the absolute difference satisfies the threshold at operation 740 (e.g., is of sufficiently large magnitude), an instability state transition is deemed to have occurred and the application of motion stabilization to video frames subsequent to frame i is toggled. For example, if motion stabilization was "off" as of frame i, it is turned "on" at frame i and remains on until another instability state transition is subsequently detected using the same algorithm. Alternatively, if motion stabilization was "off" as of frame i, it is turned "on" at frame i and remains on until another instability state transition is subsequently detected. If the absolute difference fails to satisfy the threshold at operation 740, the instability states over the last 4n−2 frames are deemed sufficiently similar for the video stabilization applied as of frame i (e.g., stabilization either "on" or "off") to be maintained at frame i and thereafter until an instability state transition is subsequently detected.

Figure 8:
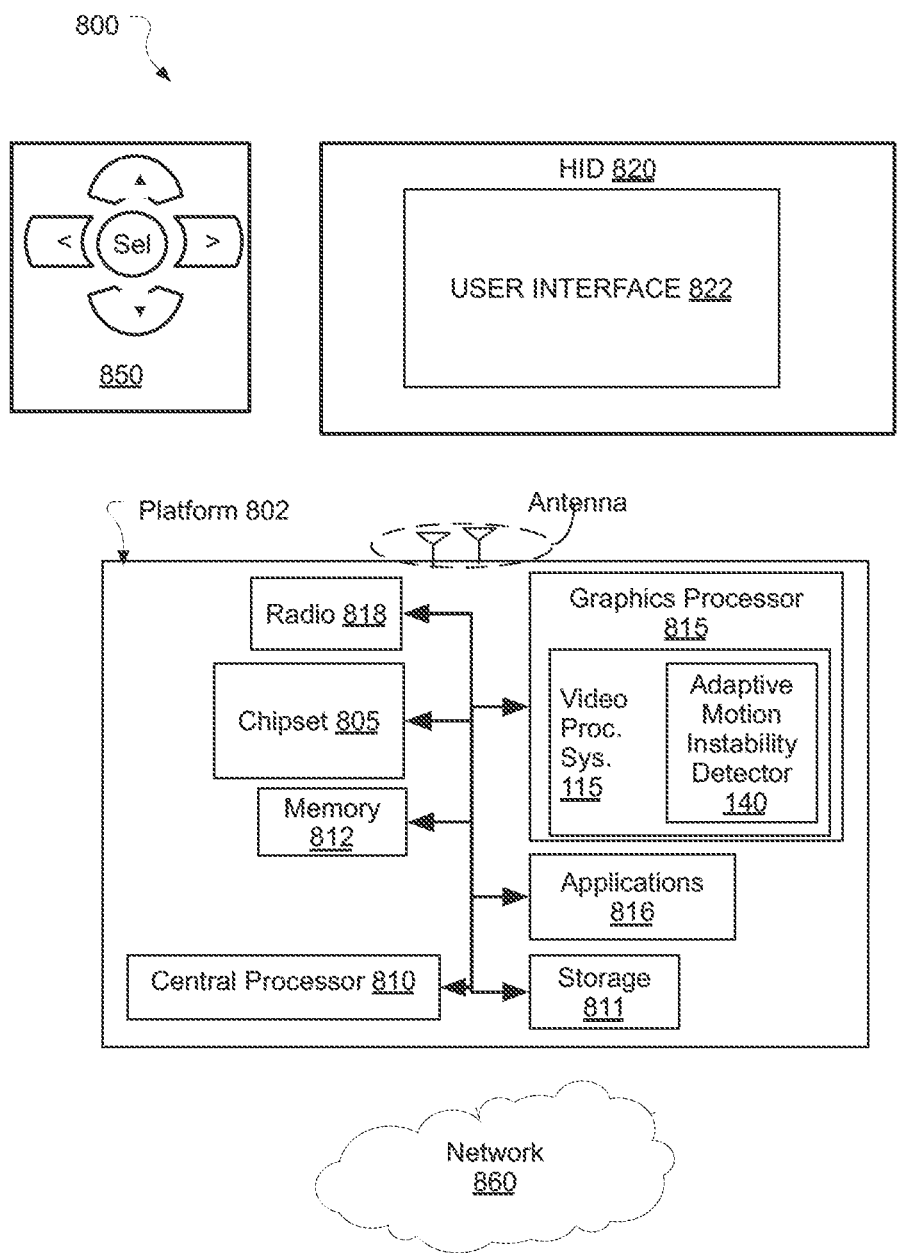
FIG. 8 is a diagram of an exemplary system, in accordance with an embodiment.

FIG. 8 is an illustrative diagram of an exemplary system 800, in accordance with embodiments. System 800 may implement all or a subset of the various functional blocks depicted in FIG. 2. For example, in one embodiment a graphics processor 815 implements a graphics processing system that includes the adaptive motion instability detector 140 as was introduced in FIG. 1B, for example having one or more of the features described elsewhere herein to perform any of the method described in the context of FIGS. 2-7. In one specific exemplary embodiment, graphics processor 815 includes fixed-function and/or programmable logic circuitry within at least one execution unit (EU), or shader core, to perform adaptive video motion instability detection, and/or selective motion stabilization of input video in response to detecting motion instability, or transitions thereof, in input video. System 800 may be a mobile device although system 800 is not limited to this context. For example, system 800 may be incorporated into a laptop computer, ultra-laptop computer, tablet, touch pad, portable computer, handheld computer, palmtop computer, cellular telephone, smart device (e.g., smart phone, smart tablet or mobile television), mobile internet device (MID), messaging device, data communication device, and so forth. System 800 may also be an infrastructure device. For example, system 800 may be incorporated into a large format television, set-top box, desktop computer, or other home or commercial network device.

In embodiments, platform 802 may include any combination of a chipset 805, processor 810, memory 812, storage 811, graphics processor 815, applications 816 and/or radio 818. Chipset 805 may provide intercommunication among processor 810, memory 812, storage 811, graphics processor 815, applications 816, or radio 818. For example, chipset 805 may include a storage adapter (not depicted) capable of providing intercommunication with storage 811.

In embodiments, platform 802 may include any combination of a chipset 805, processor 810, memory 812, storage 814, graphics processor 815, applications 816 and/or radio 818. Chipset 805 may provide intercommunication among processor 810, memory 812, storage 814, graphics processor 815, applications 816, or radio 818. For example, chipset 805 may include a storage adapter (not depicted) capable of providing intercommunication with storage 814.

Processor 810 may be implemented as one or more Complex Instruction Set Computer (CISC) or Reduced Instruction Set Computer (RISC) processors; x86 instruction set compatible processors, multi-core, or any other microprocessor or central processing unit (CPU). In embodiments, processor 810 may be a multi-core processor(s), multi-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 811 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 811 may include technology to increase the storage performance enhanced protection for valuable digital media when multiple hard drives are included, for example.

Graphics processor 815 may perform processing of images such as still or video media data for display, or perform general computing functions in a highly parallel manner. Graphics processor 815 may include one or more GPU, or visual processing unit (VPU), for example. An analog or digital interface may be used to communicatively couple graphics processor 815 and display 820. For example, the interface may be any of a High-Definition Multimedia Interface, Display Port, wireless HDMI, and/or wireless HD compliant techniques. Graphics processor 815 may be integrated with central processor 810 onto a single chip (i.e., SoC) as a graphics core or provided as part of chipset 805. In some implementations, graphics processor 815 may be a stand-alone card communicatively coupled to chipset 805. In various exemplary embodiments, graphics processor 815 and/or central processor 810 invokes or otherwise implements video motion instability mediation processes. Graphics processor 815 includes functionality to perform adaptive motion instability detection methods upon which video motion instability mediation processes may be predicated, for example as described elsewhere herein.

The video motion instability mediation processes predicated upon adaptive motion instability detection as described herein may be implemented in various hardware architectures, cell designs, or "IP cores." As still another embodiment, the methods and functions described herein in the context of graphics processor may be extended to a general-purpose processor, including a multi-core processor. In further embodiments, the methods and functions may be implemented in a purpose-built consumer electronics device, such as a game console processor.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, HID 820 may include any television type monitor or display. HID 820 may include, for example, a computer display screen, touch screen display, video monitor, television-like device, and/or a television. HID 820 may be digital and/or analog. In embodiments, HID 820 may be a holographic display. Also, HID 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on HID 820.

In embodiments, platform 802 may receive control signals from navigation controller 850 having one or more navigation features. The navigation features of controller 850 may be used to interact with user interface 822, for example. In embodiments, navigation controller 850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 850 may be replicated on a display (e.g., HID 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In embodiments, controller 850 may not be a separate component but may be integrated into platform 802 and/or HID 820.

The present disclosure, however, is not limited to the elements or in the context shown or described herein.

In embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (MC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Figure 9:
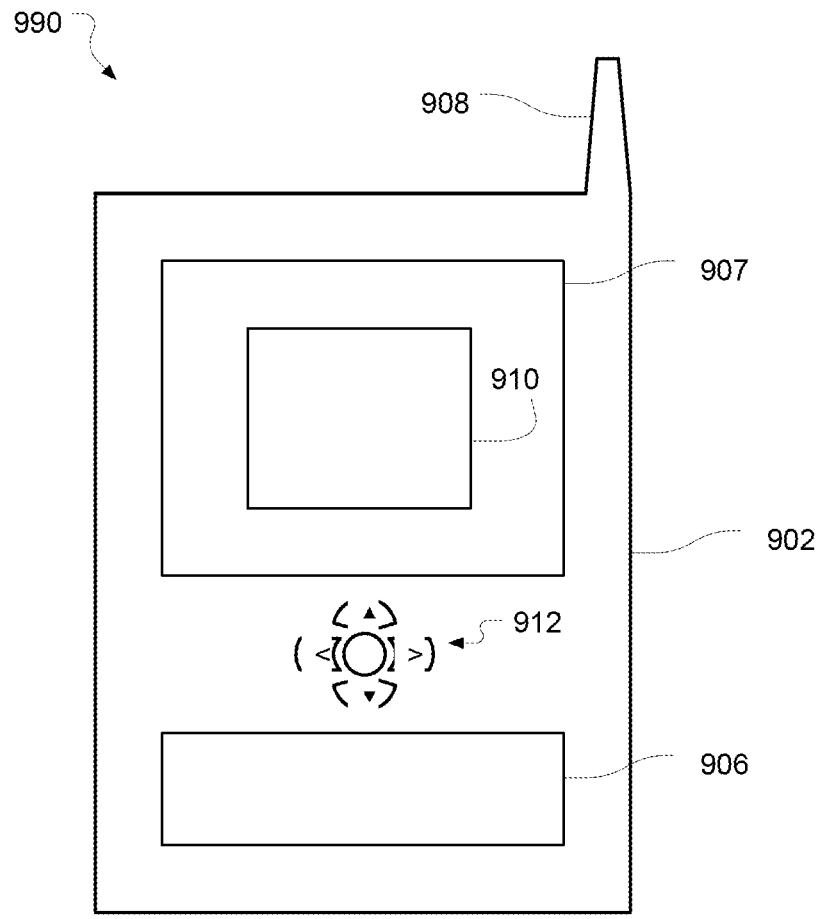
FIG. 9 is a diagram of an exemplary system, arranged in accordance with an embodiment.

As described above, system 800 may be embodied in varying physical styles or form factors. FIG. 9 illustrates embodiments of a small form factor device 990 in which system 1000 may be embodied. In embodiments, for example, device 990 may be implemented as a mobile computing device having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, tablet or smart television), mobile internet device (MID), messaging device, data communication device, and so forth.

Examples of a mobile computing device also may include computers and/or media capture/transmission devices configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 990 may include a housing 902, a display 907, an input/output (I/O) device 906, and an antenna 908. Device 990 also may include navigation features 912. Display 907 may include any suitable display unit for displaying information 910 appropriate for a mobile computing device. I/O device 1206 may include any suitable I/O device for entering information 910 into a mobile computing device. Examples for I/O device 906 may include an alphanumeric keyboard, a numeric keypad, a touch pad, input keys, buttons, switches, rocker switches, microphones, speakers, voice recognition device and software, and so forth. Information 910 also may be entered into device 990 by way of microphone (not shown), or may be digitized by a voice recognition device. Embodiments are not limited in this context.

Embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood to have been physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following examples pertain to particular exemplary embodiments.

In first embodiments, a computer-implemented video processing method includes receiving video frames, determining an initial state of motion instability associated with a plurality of the frames, and monitoring for a motion instability state transition by comparing a first level of instability associated with a first plurality of the frames with a second level of instability associated with a second plurality of the frames. The method further includes toggling image stabilization of received video frames based on the initial instability state, and based on an instability state transition, and storing the stabilized or non-stabilized video frames to a memory.

In furtherance of the first embodiments, toggling the image stabilization further includes applying motion stabilization to received video frames in response to an initial level of instability satisfying a first threshold, and until the change in the level of instability satisfies a second threshold. Alternatively, toggling the image stabilization further includes bypassing motion stabilization in response to the initial level of instability failing to satisfy the first threshold, and until the change in the level of instability satisfies the second threshold.

In furtherance of the first embodiments, determining the initial instability state further includes computing a motion jitter value for each of a first plurality of video frames. Determining the initial instability state further includes determining a first instability score for at least some of the first plurality of video frames, each score indicative of motion jitter values associated with a predetermined number of prior video frames. Determining the initial instability state further includes determining a statistic indicative of first instability scores accumulated over the predetermined number of first motion jitter values. Determining the initial instability state further includes comparing the statistic against a threshold.

In furtherance of the first embodiments, determining the initial instability state further includes computing a motion jitter value for each of a first plurality of video frames. Determining the initial instability state further includes determining a first instability score for at least some of the first plurality of video frames, each score based on a comparison between the Gaussian distribution and a distribution of the motion jitter values associated with a predetermined number of prior video frames. Determining the initial instability state further includes determining an average of the first instability scores over the predetermined number of first motion jitter values. Determining the initial instability state further includes comparing the average against a threshold.

In furtherance of the first embodiments, determining the initial instability state further includes computing first motion jitter values for video frames until a predetermined number of first motion jitter values have been computed. Determining the initial instability state further includes determining a first instability score indicative of one or more of the first motion jitter values. Determining the initial instability state further includes determining a first statistic indicative of the first instability scores accumulated over the predetermined number of first motion jitter values. Monitoring for the motion instability state transition further includes computing second motion jitter values for video frames after the predetermined number of jitter values has been computed. Monitoring for the motion instability state transition further includes thresholding a comparison between one or more of the first instability scores and one or more second instability scores indicative of the second motion jitter values.

In furtherance of the first embodiments, determining levels of motion instability further includes computing a motion jitter value for each of a plurality of video frames. Determining levels of motion instability further includes testing the motion jitter values for normality. Toggling the image stabilization based on the initial instability state further includes applying motion stabilization to received video frames in response to the motion jitter values satisfying the normality test. Toggling the image stabilization based on the initial instability state further includes bypassing motion stabilization in response to the motion jitter values failing the normality test.

In furtherance of the first embodiments, determining levels of motion instability further includes computing a motion jitter value for each of a plurality of video frames. Determining levels of motion instability further includes testing the motion jitter values for normality. Toggling the image stabilization based on the change in the level of instability further includes modifying the application of motion stabilization to received video frames in response to a difference between a first statistic, associated with a first plurality of normality tests, and a second statistic, associated with a second plurality of normality tests, satisfying a threshold. Toggling the image stabilization based on the change in the level of instability further includes maintaining the application of motion stabilization in response to the difference between the first and second statistic failing to satisfy the threshold.

In furtherance of the first embodiments, monitoring for the motion instability state transition further includes computing a motion jitter value for each of a first plurality of video frames. Monitoring for the motion instability state transition further includes determining a first instability score for at least some of the first plurality of video frames, each score indicative of motion jitter values associated with a predetermined number of prior video frames. Monitoring for the motion instability state transition further includes determining a first statistic of the first instability scores. Monitoring for the motion instability state transition further includes computing a motion jitter value for each of a second plurality of video frames. Monitoring for the motion instability state transition further includes determining a second instability score for at least some of the second plurality of video frames, each score indicative of motion jitter values associated with the predetermined number of prior video frames. Monitoring for the motion instability state transition further includes determining a second statistic of the second instability scores. Monitoring for the motion instability state transition further includes comparing a threshold to a difference between the first and second statistic.

In furtherance of the first embodiments, receiving video frames further comprises receiving a video frame i. Determining the initial motion instability state associated with a plurality of the frames further includes computing a jitter value for each of n consecutive video frames inclusive of jitter values $J_i$ and $J_n$. Determining the initial motion instability state associated with a plurality of the frames further includes determining an instability score for each of the n video frames, wherein each of the instability scores is based on a hypothesis test comparing a Gaussian distribution with a distribution of the motion jitter values associated with n frames. Determining the initial motion instability state associated with a plurality of the frames further includes averaging the instability scores over the n video frames. Toggling image stabilization of received video frames based on the initial instability state further includes toggling motion stabilization to video frames received after frame i in response to the averaged instability score satisfying a first threshold.

In furtherance of the embodiment described above, monitoring for the motion instability state transition further includes computing a motion jitter value for each of 4n−2 consecutive video frames inclusive of 2n−1 frames associated with jitter values $J_i$ through $J_{i-2n+2}$ and 2n−1 frames associated with jitter values $J_{i-2n+1}$ and $J_{i-4n+3}$. Monitoring for the motion instability state transition further includes determining a first instability score for each of n video frames ending with video frame associated with jitter value $J_{i-2n+1}$, wherein each of the first instability scores is based on a hypothesis test comparing a Gaussian distribution with a distribution of the motion jitter values associated with n frames. Monitoring for the motion instability state transition further includes averaging the first instability scores over n video frames. Monitoring for the motion instability state transition further includes determining a second instability score for each of n video frames ending with video frame i, wherein each of the second instability scores is based on the hypothesis test. Monitoring for the motion instability state transition further includes averaging the second instability scores over n video frames, and comparing a second threshold to a difference between the first and second averaged instability score. Toggling image stabilization of received video frames based on the change in the level of instability further includes modifying the application of motion stabilization to received video frames in response to the difference between the first and second averaged instability score satisfying the second threshold. Toggling image stabilization of received video frames based on the change in the level of instability further includes maintaining an application of motion stabilization in response to the difference between the first and second averaged instability score failing to satisfy the second threshold.

In second embodiments, a processor includes logic circuitry to receive video frames. The processor includes motion instability detection logic circuitry to determine an initial motion instability state associated with a plurality of the frames. The processor includes motion instability detection logic circuitry to monitor for a motion instability state transition by comparing a first level of instability associated with a first plurality of the frames with a second level of instability associated with a second plurality of the frames. The processor includes motion instability detection logic circuitry to toggle image stabilization of video frames based on the initial motion instability state, and based on a motion instability state transition.

In furtherance of the second embodiments, the motion instability detection logic circuitry is further to apply motion stabilization to received video frames in response to an initial level of instability satisfying a first threshold, and until the change in the level of instability satisfies a second threshold. The motion instability detection logic circuitry is further to bypass motion stabilization in response to the initial level of instability failing to satisfy the first threshold, and until the change in the level of instability satisfies the second threshold.

In furtherance of the second embodiments, the motion instability detection logic circuitry is to compute first motion jitter values for video frames until a predetermined number of first motion jitter values have been computed. The motion instability detection logic circuitry is to determine a first instability score indicative of one or more of the first motion jitter values. The motion instability detection logic circuitry is to determine a statistic indicative of first instability scores accumulated over the predetermined number of first motion jitter values. The motion instability detection logic circuitry is to toggle the image stabilization based on the statistic. The motion instability detection logic circuitry is further to compute second motion jitter values for video frames after the predetermined number of jitter values has been computed. The motion instability detection logic circuitry is further to threshold a comparison between the first instability score and a second instability score indicative of one or more of the second motion jitter values, and toggle the image stabilization based on the comparison.

In furtherance of the second embodiments, the motion instability detection logic circuitry is to compute a motion jitter value for each of a plurality of video frames. The motion instability detection logic circuitry is to test the motion jitter values for normality. The motion instability detection logic circuitry is to perform motion stabilization on received video frames in response to the motion jitter values satisfying the normality test. The motion instability detection logic circuitry is to bypass motion stabilization in response to the motion jitter values failing the normality test.

In furtherance of the second embodiments, the motion instability detection logic circuitry is to compute a motion jitter value for each of a plurality of video frames. The motion instability detection logic circuitry is to test the motion jitter values for normality. The motion instability detection logic circuitry is to modify application of motion stabilization to received video frames in response to a difference between a first statistic associated with a first plurality of normality tests, and a second statistic, associated with a second plurality of normality tests, satisfying a threshold. The motion instability detection logic circuitry is to maintain application of motion stabilization in response to the difference between the first and second statistic failing to satisfy the threshold.

In furtherance of the second embodiments, the motion instability detection logic circuitry is to compute a motion jitter value for each of a first plurality of video frames. The motion instability detection logic circuitry is to determine a first instability score for at least some of the first plurality of video frames, each score based on a comparison between the Gaussian distribution and a distribution of the motion jitter values associated with a predetermined number of prior video frames. The motion instability detection logic circuitry is to determine an average of the first instability scores. The motion instability detection logic circuitry is to compare the average of the first instability scores against a threshold.

In third embodiments, a video processing system includes one or more processor to receive video frames. The one or more processor is further to determine an initial motion instability state associated with a plurality of the frames. The one or more processor is further to monitor for a motion instability state transition by comparing a first level of instability associated with a first plurality of the frames to a second level of instability associated with a second plurality of the frames. The one or more processor is further to toggle image stabilization of received video frames based on the initial instability state, and based on an instability state transition. The video processing system further includes a memory coupled to the one or more processor to store the stabilized or non-stabilized video frames.

In furtherance of the third embodiments, the video processing system further includes a display device coupled to the memory to display the stabilized or non-stabilized video frames.

In one or more fourth embodiment, one or more computer-readable storage medium has instructions stored thereon, which when executed by a processor, cause the processor to perform a method including determining an initial motion instability state associated with a plurality of video frames. The instructions further cause the processor to perform the method including monitoring for a change in the motion instability by comparing a first level of instability associated with a first plurality of the frames with a second level of instability associated with a second plurality of the frames. The instructions further cause the processor to perform the method including toggling image stabilization of received video frames based on the initial instability state, and based on a change in the instability state. The instructions further cause the processor to perform the method including storing the stabilized or non-stabilized video frames to a memory.

In furtherance of the fourth embodiments, one or more computer-readable storage medium further includes instructions to cause the processor to perform a method, wherein determining the initial instability state further includes computing first motion jitter values for video frames until a predetermined number of first motion jitter values have been computed. The instructions further cause the processor to perform the method including determining a first instability score indicative of one or more of the first motion jitter values. The instructions further cause the processor to perform the method including determining a first statistic indicative of the first instability scores accumulated over the predetermined number of first motion jitter values. The instructions further cause the processor to perform the method including monitoring for the motion instability state transition by computing second motion jitter values for video frames after the predetermined number of jitter values have been computed, and thresholding a comparison between one or more of the first instability scores and one or more second instability scores indicative of the second motion jitter values.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include the undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. A computer-implemented video processing method, comprising:
    receiving video frames;
    determining an initial state of motion instability associated with a plurality of the frames;
    monitoring for a motion instability state transition by comparing a first level of instability associated with a first plurality of the frames with a second level of instability associated with a second plurality of the frames;
    toggling image stabilization of received video frames based on the initial state of motion instability, and based on the motion instability state transition monitoring, wherein the toggling further comprises:
        applying motion stabilization to received video frames in response to an initial level of instability satisfying a first threshold, and until a change between the first and second levels of instability satisfies a second threshold; or
        bypassing motion stabilization in response to the initial level of instability failing to satisfy the first threshold, and until a change between the first and second levels of instability satisfies the second threshold; and
    storing stabilized or non-stabilized video frames to a memory.

2. The method of claim 1, wherein determining the initial instability state further comprises:
    computing a motion jitter value for each of the first plurality of video frames;
    determining a first instability score for at least some of the first plurality of video frames, each score indicative of motion jitter values associated with a predetermined number of prior video frames;
    determining a statistic indicative of first instability scores accumulated over the predetermined number of first motion jitter values; and
    comparing the statistic against a threshold.

3. The method of claim 1, wherein determining the initial instability state further comprises:
    computing a motion jitter value for each of the first plurality of video frames;
    determining a first instability score for at least some of the first plurality of video frames, each score based on a comparison between the Gaussian distribution and a distribution of the motion jitter values associated with a predetermined number of prior video frames;
    determining an average of the first instability scores over the predetermined number of first motion jitter values; and
    comparing the average against a threshold.

4. The method of claim 1, wherein:
    determining the initial instability state further comprises:
        computing first motion jitter values for video frames until a predetermined number of first motion jitter values have been computed;
        determining a first instability score indicative of one or more of the first motion jitter values; and
        determining a first statistic indicative of the first instability scores accumulated over the predetermined number of first motion jitter values; and
    monitoring for the motion instability state transition further comprises:
        computing second motion jitter values for the second plurality of video frames; and
        thresholding a comparison between one or more of the first instability scores and one or more second instability scores indicative of the second motion jitter values.

5. The method of claim 1, further comprising
determining the first and second levels of motion instability
    by computing a motion jitter value for each frame of the first and second plurality of video frames; and
    testing the motion jitter values for normality; and wherein
toggling the image stabilization based on the initial instability state further comprises:
    applying motion stabilization to received video frames in response to the motion jitter values satisfying the normality test; and
    bypassing motion stabilization in response to the motion jitter values failing the normality test.

6. The method of claim 1, further comprising
determining the first and second levels of motion instability
    by computing a motion jitter value for each frame of the first and second plurality of video frames; and
    testing the motion jitter values for normality; and wherein
toggling the image stabilization based on the change in the level of instability further comprises:
    modifying the application of motion stabilization to received video frames in response to a difference between a first statistic, associated with a first plurality of normality tests determined for the first plurality of frames, and a second statistic, associated with a second plurality of normality tests determined for the second plurality of frames, satisfying a threshold; and
    maintaining the application of motion stabilization in response to the difference between the first and second statistic failing to satisfy the threshold.

7. The method of claim 1, wherein monitoring for the motion instability state transition further comprises:
    computing a motion jitter value for each of the first plurality of video frames;
    determining a first instability score for at least some of the first plurality of video frames, each score indicative of motion jitter values associated with a predetermined number of prior video frames;
determining a first statistic of the first instability scores;
computing a motion jitter value for each of the second plurality of video frames;
determining a second instability score for at least some of the second plurality of video frames, each score indicative of motion jitter values associated with the predetermined number of prior video frames;
determining a second statistic of the second instability scores; and
comparing a threshold to a difference between the first and second statistic.

8. The method of claim 1, wherein:
receiving the video frames further comprises receiving a video frame i;
determining the initial motion instability state associated with a plurality of the frames further comprises:
computing a jitter value for each of n consecutive video frames inclusive of jitter values $J_i$ and $J_n$;
determining an instability score for each of the n video frames, wherein each of the instability scores is based on a hypothesis test comparing a Gaussian distribution with a distribution of the motion jitter values associated with n frames; and
averaging the instability scores over the n video frames; and
toggling image stabilization of received video frames based on the initial instability state further comprises:
toggling motion stabilization to video frames received after frame i in response to the averaged instability score satisfying a first threshold.

9. The method of claim 8, wherein:
monitoring for the motion instability state transition further comprises:
computing a motion jitter value for each of 4n−2 consecutive video frames inclusive of 2n−1 frames associated with jitter values $J_i$ through $J_{i-2n+2}$ and 2n−1 frames associated with jitter values $J_{i-2n+1}$ and $J_{i-4n+3}$;
determining a first instability score for each of n video frames ending with video frame associated with jitter value $J_{i-2n+1}$, wherein each of the first instability scores is based on a hypothesis test comparing a Gaussian distribution with a distribution of the motion jitter values associated with n frames;
averaging the first instability scores over n video frames;
determining a second instability score for each of n video frames ending with video frame i, wherein each of the second instability scores is based on the hypothesis test;
averaging the second instability scores over n video frames; and
comparing a second threshold to a difference between the first and second averaged instability score; and
toggling image stabilization of received video frames based on the change in the level of instability further comprises:
modifying the application of motion stabilization to received video frames in response to the difference between the first and second averaged instability score satisfying the second threshold; and
maintaining an application of motion stabilization in response to the difference between the first and second averaged instability score failing to satisfy the second threshold.

10. A processor comprising:
logic circuitry to receive video frames;
motion instability detection logic circuitry to:
determine an initial motion instability state associated with a plurality of the frames;
monitor for a motion instability state transition by comparing a first level of instability associated with a first plurality of the frames with a second level of instability associated with a second plurality of the frames;
apply motion stabilization to received video frames in response to an initial level of instability satisfying a first threshold, and until a change between the first and second levels of instability satisfies a second threshold; and
bypass motion stabilization in response to the initial level of instability failing to satisfy the first threshold, and until the change between the first and second levels of instability satisfies the second threshold.

11. The processor of claim 10, wherein:
the motion instability detection logic circuitry is to:
compute first motion jitter values for the first plurality of video frames until a predetermined number of first motion jitter values have been computed;
determine a first instability score indicative of one or more of the first motion jitter values;
determine a statistic indicative of first instability scores accumulated over the predetermined number of first motion jitter values;
apply or bypass motion stabilization for one or more of the video frames based on the statistic; and
the motion instability detection logic circuitry is further to:
compute second motion jitter values for the second plurality of video frames;
threshold a comparison between the first instability score and a second instability score indicative of one or more of the second motion jitter values; and
toggle the motion stabilization based on the comparison.

12. The processor of claim 10, wherein the motion instability detection logic circuitry is to:
compute a motion jitter value for each of the first plurality of video frames;
test the motion jitter values for normality;
perform motion stabilization on received video frames in response to the motion jitter values satisfying the normality test; and
bypass motion stabilization in response to the motion jitter values failing the normality test.

13. The processor of claim 10, wherein the motion instability detection logic circuitry is to:
compute a motion jitter value for each of the first plurality of video frames;
test the motion jitter values for normality; and
modify application of motion stabilization to received video frames in response to a difference between a first statistic, associated with a first plurality of normality tests determined for the first plurality of frames, and a second statistic, associated with a second plurality of normality tests determined for the second plurality of frames, satisfying a threshold; and
maintain application of motion stabilization in response to the difference between the first and second statistic failing to satisfy the threshold.

14. The processor of claim 10, wherein the motion instability detection logic circuitry is to:
compute a motion jitter value for each of the first plurality of video frames;

determine a first instability score for at least some of the first plurality of video frames, each score based on a comparison between the Gaussian distribution and a distribution of the motion jitter values associated with a predetermined number of prior video frames; and
determine an average of the first instability scores; and
compare the average of the first instability scores against a threshold.

15. A video processing system, comprising:
one or more processor to:
  receive video frames;
  compute first motion jitter values for a first plurality of the video frames until a predetermined number of first motion jitter values have been computed;
  determine a first instability score indicative of one or more of the first motion jitter values;
  determine a statistic indicative of first instability scores accumulated over the predetermined number of first motion jitter values;
  apply or bypass motion stabilization for one or more of the video frames based on the statistic;
  compute second motion jitter values for a second plurality of the video frames;
  threshold a comparison between the first instability score and a second instability score indicative of one or more of the second motion jitter values; and
  toggle motion stabilization of received video frames based on the comparison; and
a memory coupled to the one or more processor to store stabilized or non-stabilized video frames.

16. The video processing system of claim 15, further comprising a display device coupled to the memory, and to display the stabilized or non-stabilized video frames.

17. One or more non-transitory computer-readable storage medium having instructions stored thereon, which when executed by a processor, cause the processor to perform a method comprising:
  determining an initial motion instability state associated with a plurality of video frames;
  monitoring for a change in the motion instability by comparing a first level of instability associated with a first plurality of the frames with a second level of instability associated with a second plurality of the frames;
  toggling image stabilization of received video frames based on the initial instability state, and based on a change in the instability state, wherein the toggling further comprises:
    applying motion stabilization to received video frames in response to an initial level of instability satisfying a first threshold, and until a change between the first and second levels of instability satisfies a second threshold; or
    bypassing motion stabilization in response to the initial level of instability failing to satisfy the first threshold, and until a change between the first and second levels of instability satisfies the second threshold; and
  storing stabilized or non-stabilized video frames to a memory.

18. The one or more non-transitory computer-readable storage medium of claim 17, further comprising instructions to cause the processor to perform a method for determining the initial instability state further comprising:
  computing first motion jitter values for the first plurality of video frames until a predetermined number of first motion jitter values have been computed;
  determining a first instability score indicative of one or more of the first motion jitter values; and
  determining a first statistic indicative of the first instability scores accumulated over the predetermined number of first motion jitter values; and
further comprising instructions to cause the processor to perform a method for monitoring for the motion instability state transition further comprising:
  computing second motion jitter values for the second plurality of video frames after the predetermined number of jitter values have been computed; and
  thresholding a comparison between one or more of the first instability scores and one or more second instability scores indicative of the second motion jitter values.

* * * * *